United States Patent [19]

Yasui et al.

[11] Patent Number: 5,058,123
[45] Date of Patent: * Oct. 15, 1991

[54] LASER APPARATUS

[75] Inventors: Koji Yasui; Masaaki Tanaka; Shigenori Yagi; Masaki Kuzumoto, all of Hyogo, Japan

[73] Assignee: Mitsubishi Denki K.K., Tokyo, Japan

[ * ] Notice: The portion of the term of this patent subsequent to Feb. 20, 2007 has been disclaimed.

[21] Appl. No.: 432,357

[22] Filed: Nov. 8, 1989

Related U.S. Application Data

[63] Continuation-in-part of Ser. No. 130,128, Dec. 8, 1987, abandoned.

[30] Foreign Application Priority Data

| Dec. 8, 1986 | [JP] | Japan | 61-29186 |
| Apr. 23, 1987 | [JP] | Japan | 62-100782 |
| Apr. 23, 1987 | [JP] | Japan | 62-100783 |
| Sep. 3, 1987 | [JP] | Japan | 62-220772 |
| Sep. 14, 1987 | [JP] | Japan | 62-230715 |

[51] Int. Cl.[5] .................................................. H01S 3/08
[52] U.S. Cl. ........................................ 372/99; 372/95; 372/103; 372/108; 372/9
[58] Field of Search ................ 372/95, 108, 9, 103, 372/99, 101

[56] References Cited

U.S. PATENT DOCUMENTS

| 3,919,664 | 11/1975 | McAllister | 372/95 |
| 4,327,129 | 4/1988 | Sepp | 427/164 |
| 4,553,244 | 11/1985 | Benedict et al. | 372/108 |
| 4,903,271 | 2/1990 | Yasui et al. | 372/9 |

OTHER PUBLICATIONS

Gobbi et al.; "Novel Unstable Resonator Configuration with a Self-Filtering Aperature: Exper. Character. of Nd:YAG Loaded Cavity"; Appl. Optics, vol. 24, No. 1, Jan. 1, '85.

Primary Examiner—Léon Scott, Jr.
Attorney, Agent, or Firm—Sughrue, Mion, Zinn Macpeak & Seas

[57] ABSTRACT

An output laser beam of an unstable laser resonator has a circular cross sectional pattern, so that a condensation thereof becomes easy, resulting in a high power beam. The circular pattern is obtained by making an expanding mirror of the resonator partially transmissible and compensating for a phase difference between laser beam portions passing through the expanding mirror and other portion of a window mirror.

29 Claims, 10 Drawing Sheets

LASER APPARATUS

This is a Continuation-in-part, of application Ser. No. 07/130,128, filed 12/8/87, now abandoned.

BACKGROUND OF THE INVENTION

The present invention relates to a laser apparatus and, particularly, to an improvement of the laser beam quality of a high power laser apparatus.

FIG. 24 is a cross sectional side view of a conventional laser apparatus having an unstable resonator such as shown in "Laser Handbook", 1979, North-Holland Publishing Company. In FIG. 24, a full reflection mirror system composed of a collimating mirror 1 which is a concave mirror and a convex, expanding mirror 2 are arranged opposite the collimating mirror Reference numeral 3 depicts a laser medium which may be a gas medium capable of being excited by electric discharge when an associated laser is a gas laser such as $CO_2$ laser or a glassy medium to be excited by such as a flash lamp when the laser is a solid state laser such as a YAG laser. Reference numeral 4 depicts a window mirror which has a non-reflective coating 5 and, together with the full reflection mirror and an enclosure 6, defines an optical resonance cavity in which laser beam 7 is generated which is derived through the window mirror 4 surrounding the expanding mirror 2 as an output beam.

In operation, the mirrors 1 and 2 constitute an unstable resonator and laser beam reflected by the mirror 2 and diverging therefrom is amplified by the laser medium 3 and then collimated by the collimating mirror 1 to a parallel beam which is derived from the peripheral portion of the window mirror 4 as an annular beam 8. Since the output beam 8 is substantially coherent, it can be used effectively for cutting or welding steel plate etc. after being condensed by a suitable lens system to a pattern having beam energy density highest in a center portion thereof.

The degree of condensation depends upon a ratio of an inner diameter of the annular laser beam pattern to an outer diameter thereof, i.e., magnification factor ( referred to as "M value" hereinafter), and the larger the M value, i.e., the higher the energy density of the center portion of the condensed beam, provides the better condensation. However, since, when the M value is made too large, an oscillation efficiency is substantially degraded, an upper limit of the M value is practically in the order of 2. Thus, it is impossible to make the M value closer to a maximum value with which the maximum condensation is obtained. Further, since the window mirror 4 is non-uniformly heated by the output laser beam having the annular pattern, a non-uniform internal stress is produced in the mirror 4 by which phase distribution of the output beam passing therethrough is changed causing the condensation to be degraded.

SUMMARY OF THE INVENTION

In view of the drawbacks inherent to the conventional laser apparatus, an object of the present invention is to provide a laser apparatus from which it is possible to derive a laser beam of high quality which has the M value approximating infinite value without degrading the oscillation efficiency.

In the laser apparatus according to the present invention, the expanding mirror has a partial transmittivity and two beam portions reflected to the expanding mirror and an annular outside portion thereof are derived externally with phase difference therebetween being cancelled out from each other.

The expanding mirror used in this invention functions to pass a portion of a laser beam therethrough to thereby shape the laser beam to not an annular pattern but a circular pattern.

BRIEF DESCRIPTION OF THE DRAWING

FIGS. 3a to 23 are cross-sectional side views of other embodiments of the present invention, respectively.

DETAILED DESCRIPTION OF THE PREFERRED EMBODIMENTS

Figure 1:
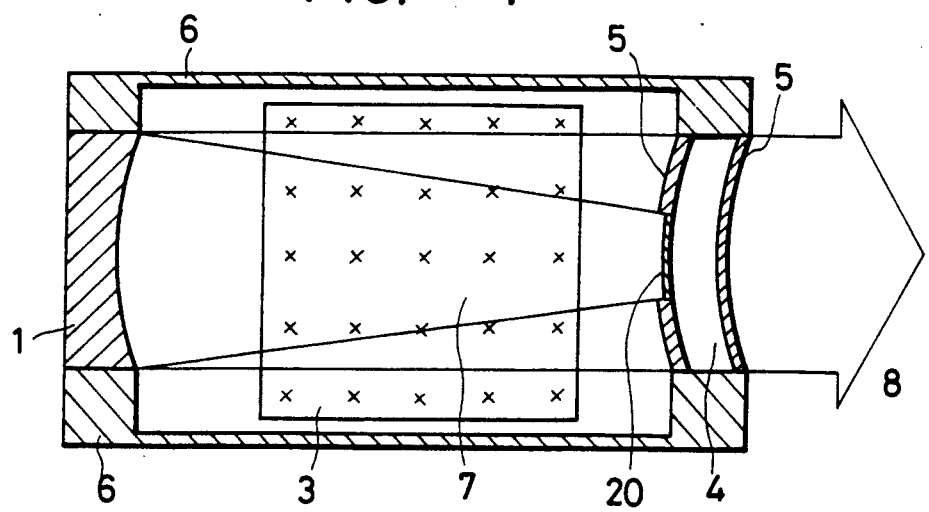
FIG. 1 is a cross-sectional side view of a laser apparatus according to an embodiment of the present invention.

In FIG. 1, a reference numeral 4 depicts a convex mirror which functions as a window mirror. The convex mirror 4 is provided on a center portion of a surface thereof facing to a collimation mirror 1 with a partial reflection membrane 20 having a partial reflectivity so that the center portion of the window mirror works as an expanding mirror. Portions of the surface of the convex mirror 4 other than the center portion thereof and an opposite surface thereof are coated with non-reflection membrane 5. This membrane can be formed from a chemical vapor deposition method or an ionized cluster beam method. The membrane can be formed of an ionized cluster beam membrane.

In operation, the collimating mirror 1 and the reflection membrane 20 of the convex mirror 4 constitute an unstable resonator and a laser beam 7 reflected and expanded by the reflection membrane 20 of the convex mirror 4 is amplified by laser medium 3 and collimated by the collimating mirror 1 to a parallel beam which is derived through the convex mirror 4 as an output laser beam 8. The laser beam 8 includes a portion passed through the partial reflection membrane 20 and a portion passed through the non-reflection membrane 5. Since the portion passed through the partial reflection membrane 20 has a partial transmittivity, a cross sectional pattern of the laser beam 8 is not annular but circular which corresponds to the M value being infinite in the sense of the conventional unstable resonator.

Figure 2A:
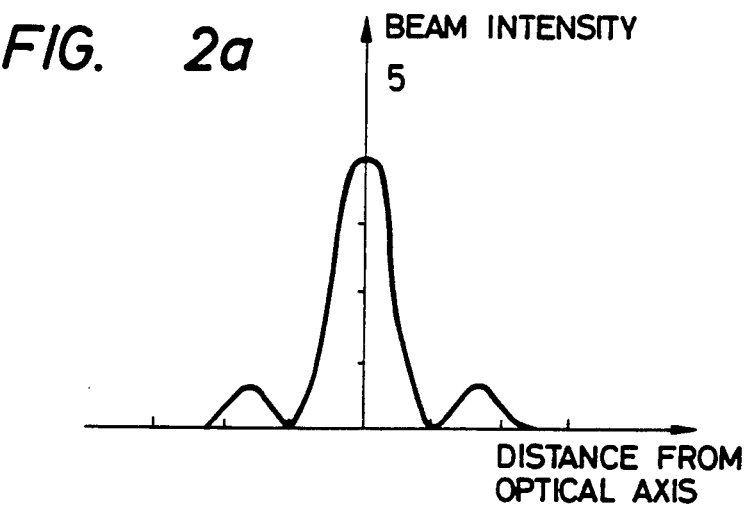
FIGS. 2a and 2b show condensing characteristics of a conventional laser apparatus and the embodiment shown in FIG. 1, respectively.
Figure 2B:
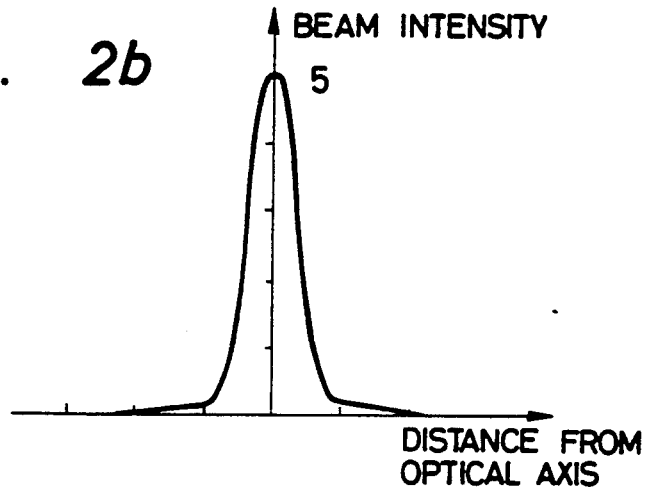

FIGS. 2a and 2b illustrate graphical characteristics of cross sectional patterns of laser beams generated by using the conventional and the present unstable resonators in $CO_2$ lasers and condensed by lenses, respectively, in which abscissa and ordinate depict distance from an optical axis and beam intensity, respectively.

In experiments from which the characteristics in FIGS. 2a and 2b are obtained, a reflectivity of the reflection membrane is selected as 50% and a ratio of outer diameter of beam to a diameter of the reflection membrane 20 is selected as 1.5 so that the oscillation characteristics of the present resonator and the conventional resonator are substantially the same. That is, the present unstable resonator is the same as the conventional resonator having the M value of 2 except that transimittivity of the expanding mirror 2 is made 50%.

In order to make oscillation characteristics of the both oscillators substantially equal to each other, radii of curvature of both surfaces of the convex mirror 4 are made equal by forming them with a uniform thickness so that laser beam 8 passed through the convex mirror 4 maintains its parallelism. Comparing the condensing characteristics in FIGS. 2a and 2b, it is clear that beam intensity in a center portion of the present invention is high and well concentrated on the optical axis as shown in FIG. 2b.

It has been confirmed that a main lobe at the center portion contains 82% of a total laser power, which substantially corresponds to an ideal value of 80% attainable by the conventional unstable resonator whose M value is infinite. Thus, it is clear that, according to the present invention, it is possible to obtain the condensation of substantially the theoritical limit.

Since, in the above embodiment, a difference in phase variation between laser beam passing through the non-reflection coating membrane 5 and that passing through the partial reflection membrane 20 is small, it is possible to obtain laser beam 8 which is well condensed and has substantially uniform phase. However, when the reflectivity of the partial reflection membrane 20 is increased and the thickness thereof is increased, the condensation may be degraded due to phase difference produced therebetween. Also, when a gain distribution or index distribution exists in the medium 3, such phase difference may be produce.

Figure 25:
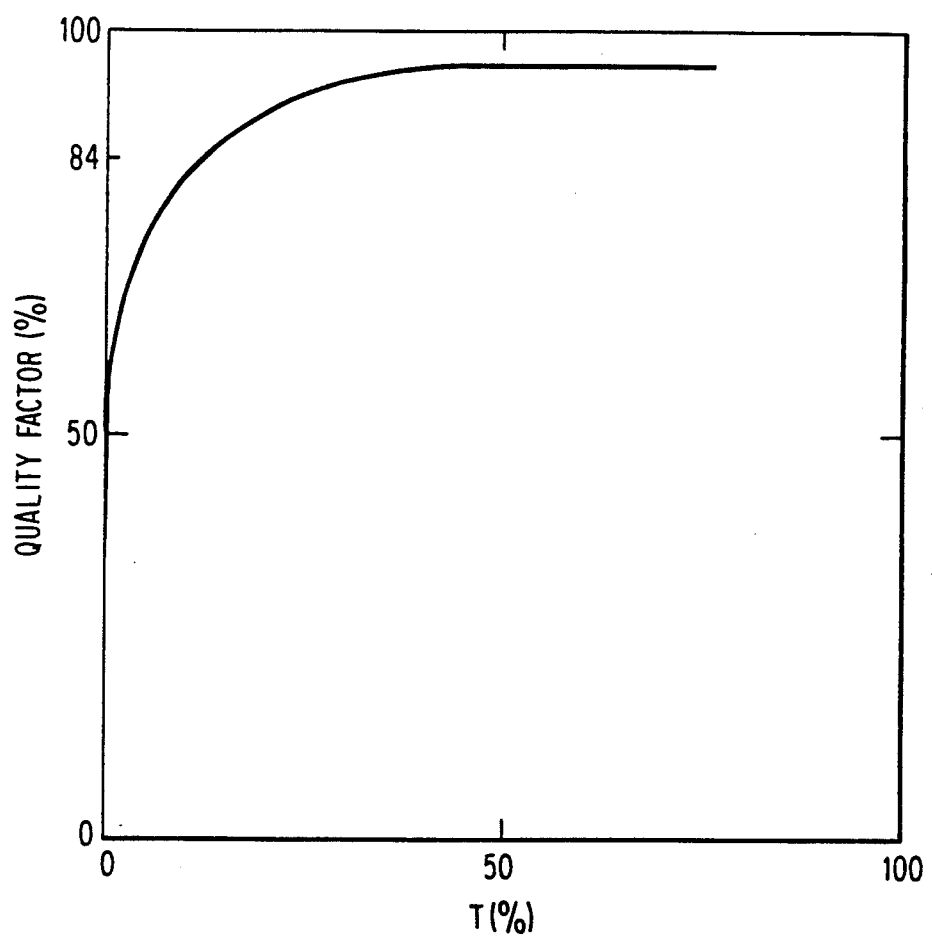
FIG. 25 is a graph illustrating the beam quality as a function of transmittivity of the expanding mirror according to the invention.

Further experiments have shown that very low transmittivity values provide improved beam quality. In particular, referring to FIG. 25, T is the transmittance of the reflection membrane 20 and the Quality Factor is an index of beam condensation. In FIG. 25, when the beam Quality Factor exceeds 84%, the beam is substantially condensed with diffraction-limited quality. A transmittivity T of zero corresponds to a conventional unstable resonator. As illustrated in FIG. 25, the beam condensation is substantially doubled with an increased transmittance of 5% resulting in the diffraction-limited condensation quality.

Figure 3:
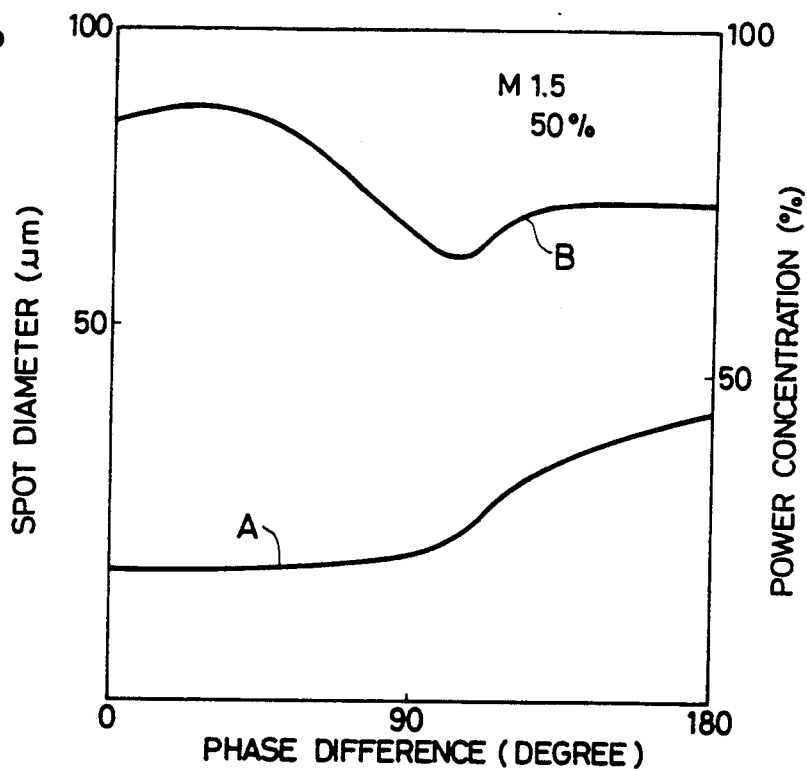
Figure 4A:
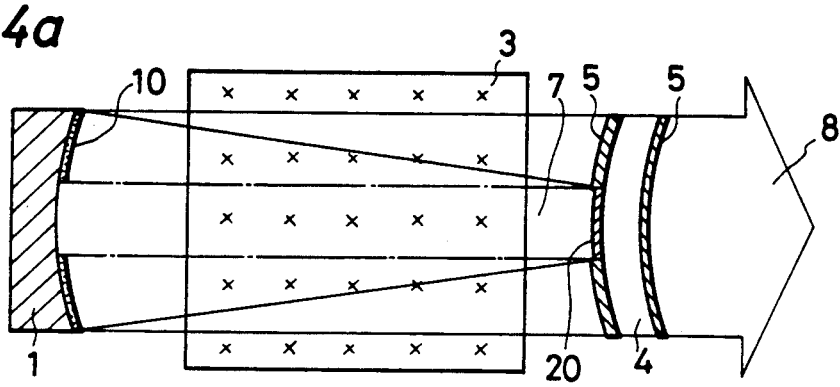
Figure 4B:
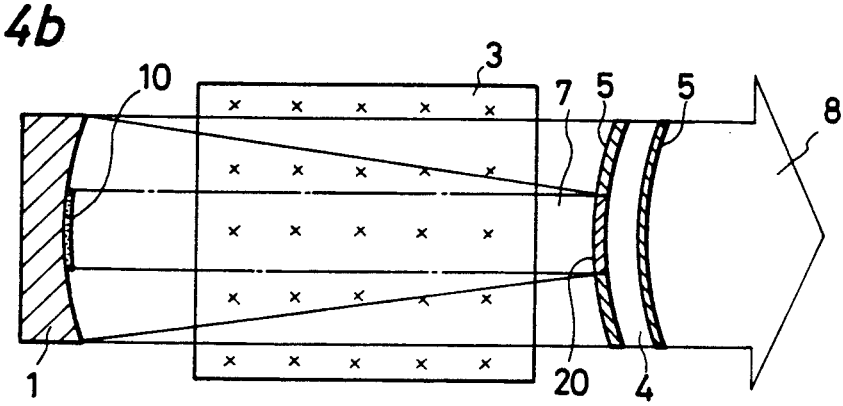

FIG. 3 is a graph showing relations between the diameter of laser a beam at a point at which beam intensity becomes $1/e^2$ times that on the optical axis at a condensing point, i.e., spot diameter of condensed light, and phase difference and between the latter and a ratio of laser power contained in the spot diameter to a total laser power, i.e., power concentration, in which phase difference (degree) is depicted by ordinate and abscissa depicts the spot diameter ($\mu$m) and the power concentration (%). In FIG. 3, a curve A corresponds to the former relation and a curve B corresponds to the latter relation, where the M value is 1.5 and the partial transmittivity of the expanding mirror is 50%. The curves A and B are obtained on the basis of wave calculation of laser beam generated in the resonator and calculation of intensity distribution at the condensing point. It is generally considered that the smaller the spot diameter and the larger the power concentration results in better condensation. In FIG. 3, when the phase difference is reduced to a value within a range form 0° to about 45°, a preferrable power concentration and a preferrable spot diameter are obtained. However, when the phase difference is 100° or more, the spot diameter among others is substantially degraded, resulting in a degraded condensation. In the latter case, it is enough to provide a reflecting metal membrane 10 on a center portion of the collimator mirror 1 a diameter of which is the same as that of the reflection membrane 20 as shown in FIG. 4b or on other portion of the collimating mirror 1 than the center portion as shown in FIG. 4a such that a thickness of the reflecting membrane 10 cancels out the phase difference. For example, assuming that the phase of laser beam passed through the reflecting membrane 20 leads that of laser beam passed through the coating layer 5 by $\theta$ (degree), the thickness d of the metal membrane 10 can be calculated as $$d = \left| \lambda \cdot \frac{\theta}{360} \right| \tag{1}$$

where $\lambda$ is wavelength of laser beam.

Figure 5A:
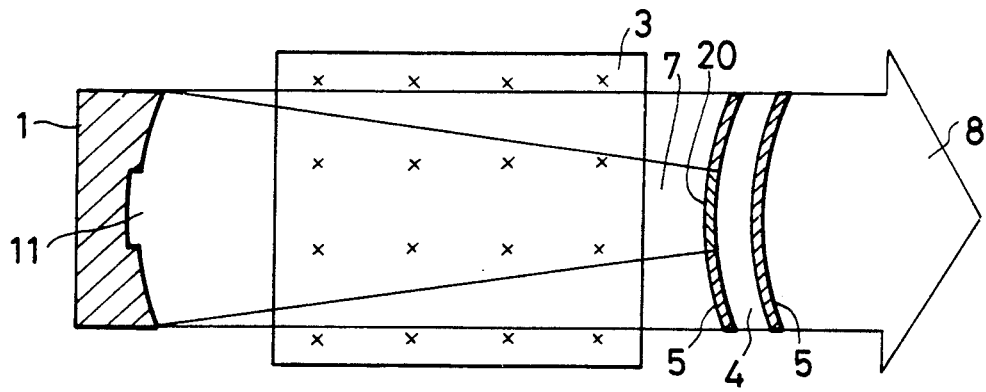
Figure 5B:
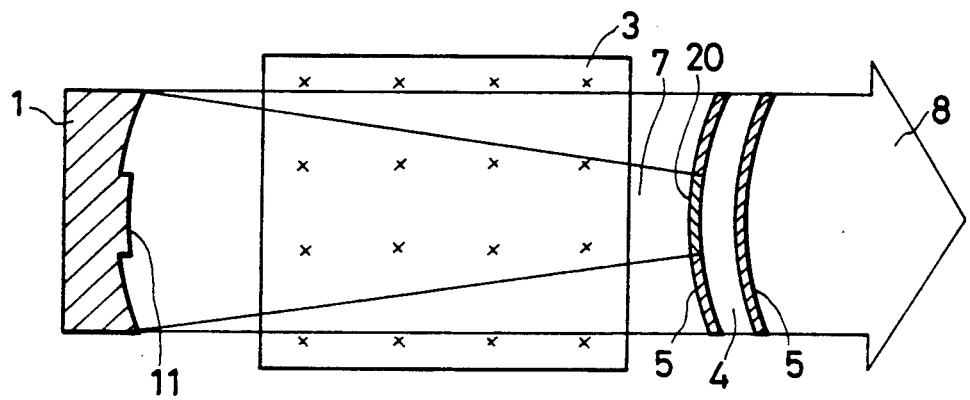
Figure 6A:
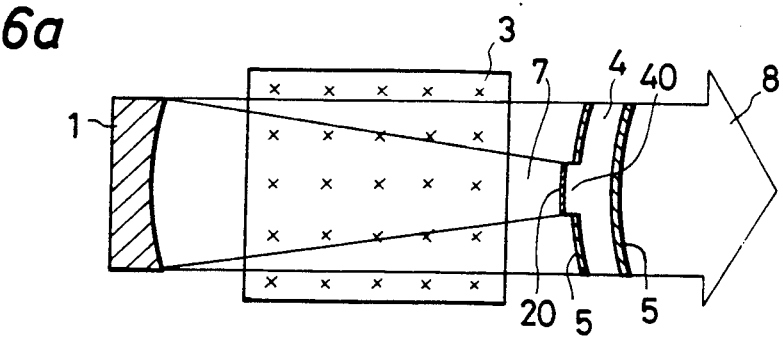
Figure 6B:
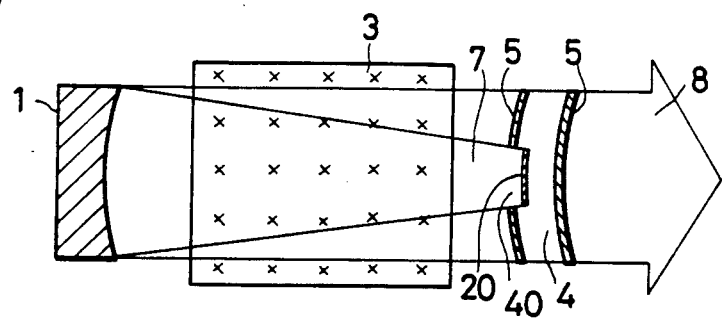
Figure 6C:
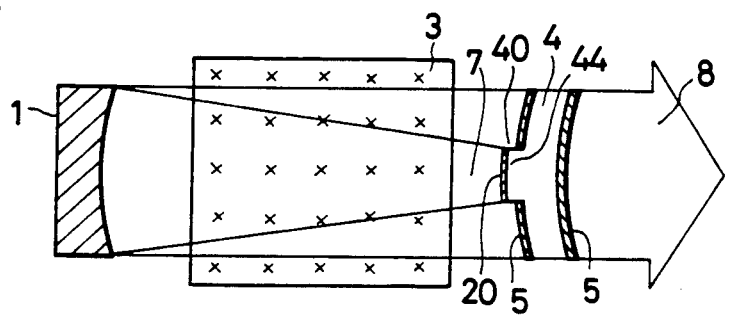
Figure 6D:
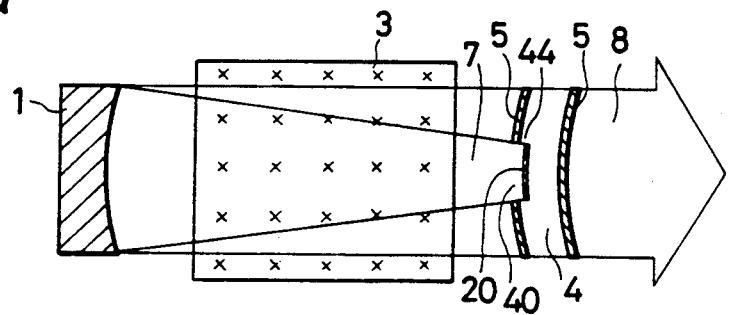

Alternatively, the same effect can be obtained by providing a stepped portion 11 such as recess (FIG. 5a) or mesa (FIG. 5b) in the center portion of the collimating mirror 1 the diameter of which is the same as that of the reflecting membrane 20 or by providing a stepped portion 40 in the convex mirror 4 as shown in FIGS. 6a and 6b. FIGS. 6c and 6d show embodiments in which the stepped portions 40 are formed by forming thin films 44 on the center portion of the convex mirror 4 and on the annular portion of the convex mirror 4 outside of the center portion thereof, respectively. The height or depth of the stepped portion is determined according to the equation (1).

Figure 7:
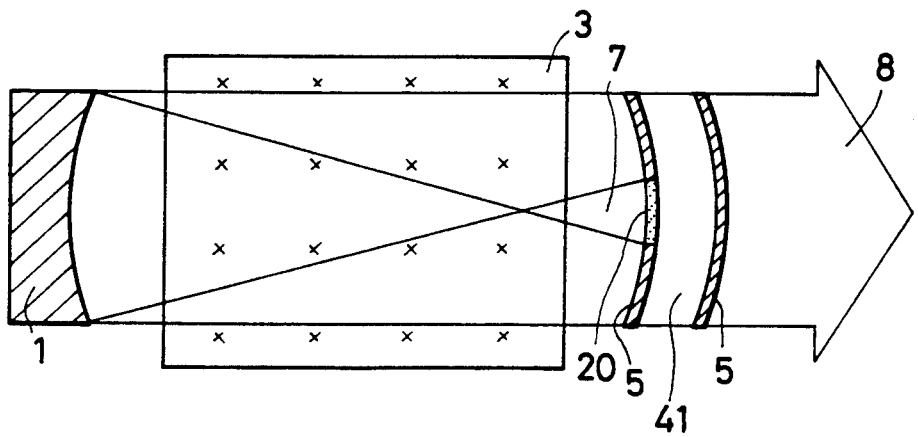

The circular pattern can be also produced by using a concave mirror 41 having a reflection membrane 20 on a center portion thereof as shown in FIG. 7. In FIG. 7, laser beam is condensed and enlarged within a resonator composed f a collimating mirror 1 and the concave mirror 41 and the latter functions as an expanding mirror having a partial transmittivity given by the reflection membrane 20.

In FIGS. 4 to 7, the resonators are shown without enclosures for simplicity of illustration. Although, in these embodiments, the expanding mirror and the window mirror are shown as integral, it is possible to provide an expanding mirror having a partial transmittivity on a concave or convex window mirror as in the conventional resonator.

Figure 8:
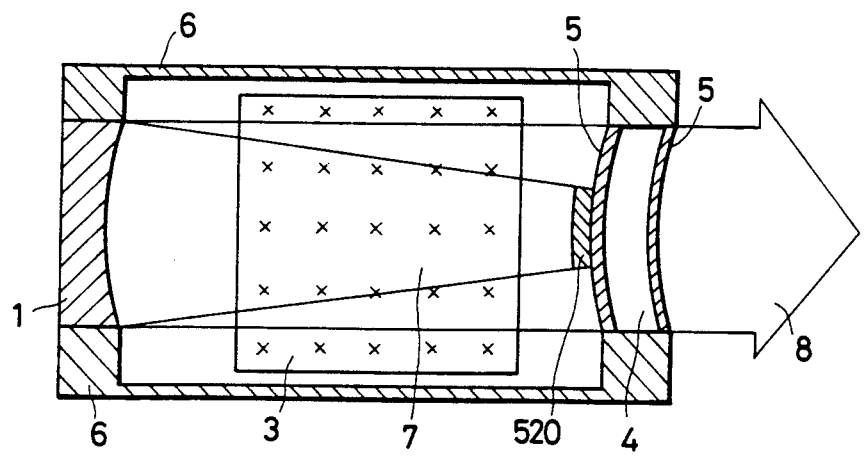

FIG. 8 shows another embodiment of an expanding mirror, in which a reference numeral 4 depicts a convex window mirror. The convex mirror 4 is formed on both surface thereof with non-reflection coatings 5 and a center portion of the coating 5 on the inner surface of the convex mirror 4 which faces to a collimating mirror 1 is coated with a high refraction index membrane 20. That is, the center portion serves as the expanding mirror having partial reflectivity.

Describing this for a case of $CO_2$ laser, the convex mirror 4 may be of ZnSe (refraction index: 2.4), non-reflection coating 5 may be of a low refraction material such as $PbF_2$ (refraction index: 1.55) and the membrane 20 may be of such as ZnSe (refraction index: 2.4).

In forming the center portion of the expanding mirror, an industrial method in which the both surfaces of the mirror are coated with the non-reflection material and then the center portion of the inner surface thereof is coated with the dielectric membrane 20 to form the expanding mirror as shown in FIG. 8 may be realized relatively easily. In such case, thickness of the dielectric membrane 20 is determined by reflectivity thereof and phase difference between laser beams passing through the expanding mirror and through the outside portion of the latter.

Figure 9:
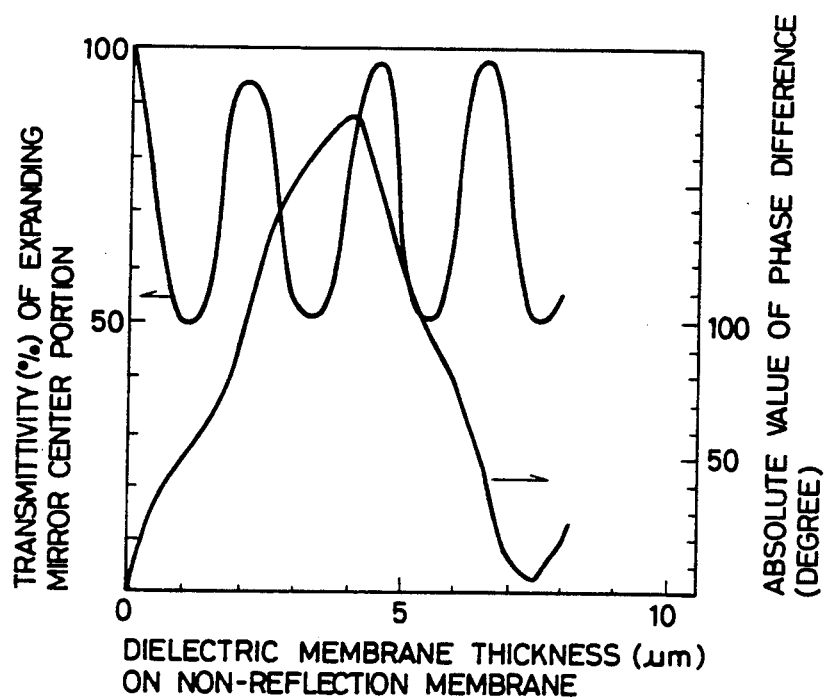

FIG. 9 shows a relation between phase difference and thickness of the partial reflection membrane and a relation between the latter and transmittivity of the center portion of the expanding mirror which is formed by a high refraction index membrane (ZnSe) on the center portion of the non-reflection membrane ($PbF_2$) 1.7 $\mu m$ thick which is formed on the inner surface of a substrate of the same material as that of the high refraction index membrane. From FIG. 9, it is clear that the thickness of the high refraction membrane should be about 7.5 $\mu m$ to make the transmittivity and phase difference 50% and not more than 45°, respectively, by which the characteristics shown in, for example, FIG. 2.

Figure 10:
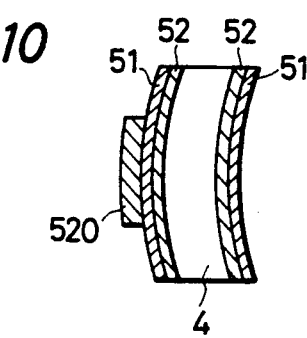
Figure 11:
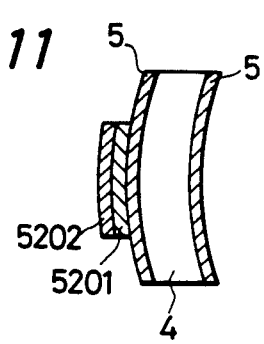

Although the non-reflection coating in FIG. 8 is composed of a single layer, it may be formed as a multilayered coating. FIG.10 shows an embodiment of the multilayered coating in which the latter is composed of two layers 51 and 52. The number of layers is arbitrary. Further, it is also possible to form the center portion with a plurality of membranes such as those shown by numerals 5201 and 5202 in FIG. 11. However, in a case of high power laser, it is preferrable that at least one of the layers is formed of the same material as that of the substrate of the mirror 4 whose absorption index is minimum.

Figure 12:
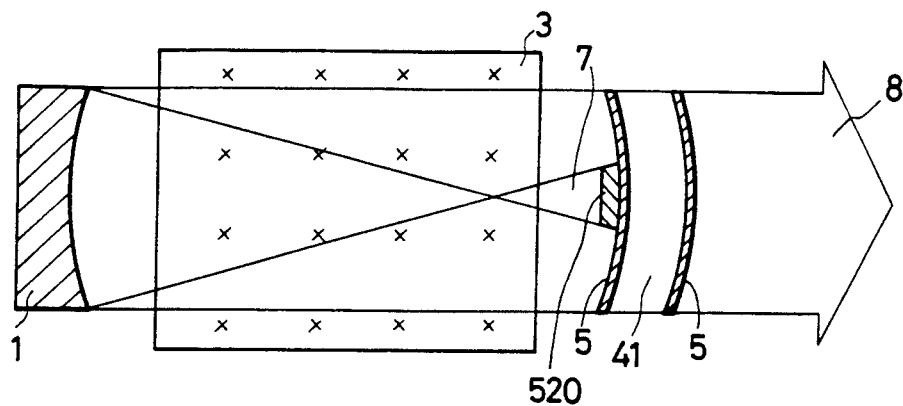

The expanding mirror can be formed by a concave mirror instead of the convex mirror, as shown in FIG. 12.

Figure 13:
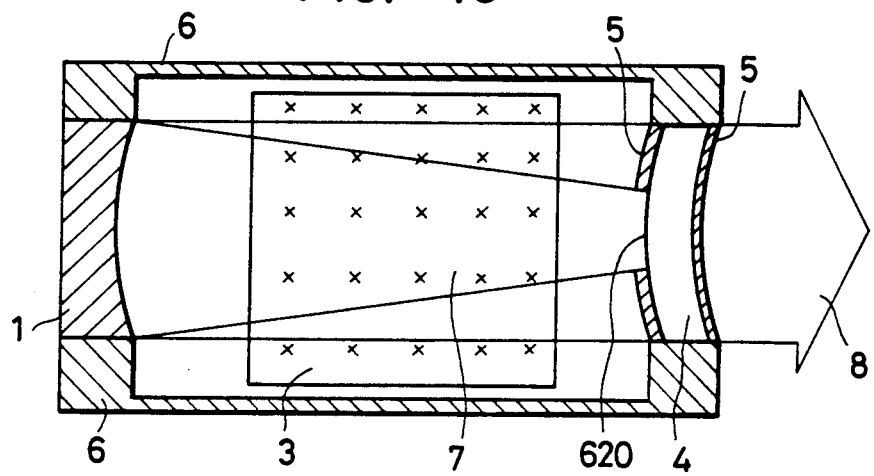

Alternatively, the expanding mirror may be formed by providing a uncoated area 620 in the center portion of the inner surface of the window mirror 4 as shown in FIG. 13. Describing this in more detail, a substantial portion of laser beam to be absorbed by the mirrors is absorbed by the coating membrane because the latter is formed by evaporation as coupled body of fine particles whose absorption index is substantially larger than that of the substrate material. Therefore, when a substantial portion of laser beam is derived through the portion on which no coating is formed as shown in FIG. 13, the absorption of laser beam by the mirror 4 is minimized and a distortion of the mirror is minimized thereby, causing a high power laser beam to be derived stably.

It is known that, when there is a phase difference between laser beams passing through the non-coated portion 620 and the coated portion 5, it becomes impossible to collimate an output laser beam to a small area. According to the present invention, however, in which the both beams are combined, such phase difference is generally very small. For example, in a $CO_2$ laser having the non-reflection coating 5 composed of two layers, one being of ZnSe and the other being of $ThF_4$ ( refraction index: 1.35 ), and the window mirror of ZnSe, phase of beam portion passed through the portion 5 leads that passed through the portion 20 by 17°. According to FIG. 3, such phase difference as small as 17° does not affect the condensing performance, substantially.

Figure 14:
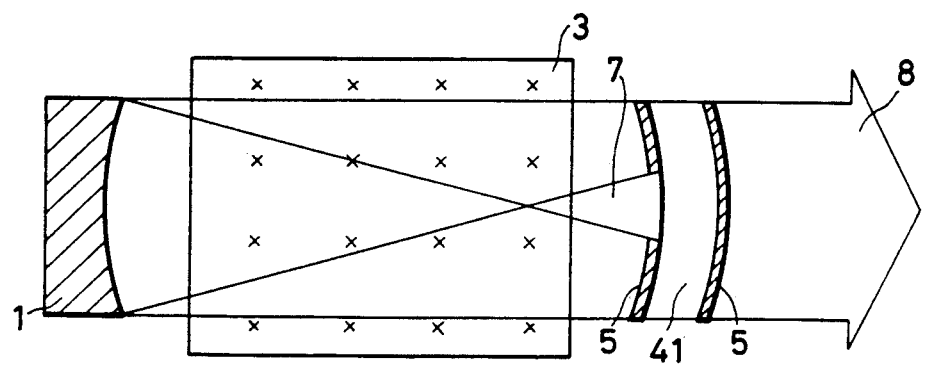

Although the convex mirror is used as the expanding mirror in the above mentioned embodiment, it is possible to form the expanding mirror by using a concave mirror as shown in FIG. 14.

Figure 15:
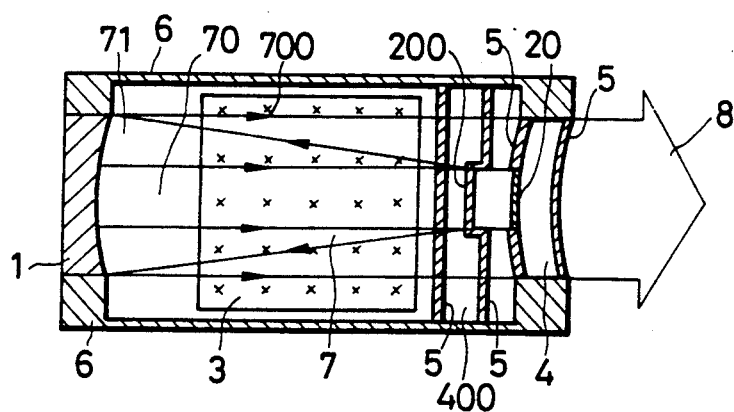

FIG. 15 shows another means for cancelling out the phase difference between laser beams passing through the expanding mirror and an outside area of the expanding mirror. In FIG. 15, a reference numeral 4 depicts a convex window mirror and on a center portion of a surface thereof facing to a collimating mirror 1 a partial reflection membrane 20 having a partial reflectivity is formed which serves as an expanding mirror. On the other surface and an annular portion surounding the center portion of the one surface thereof, non-reflection coating membranes 5 are formed. A phase compensating mirror 400 having both surfaces coated with non-reflection membranes 5 and a stepped center portion 200 is arranged between the convex mirror and the collimating mirror 1.

Beam portions 70 and 71 of laser beam 7 are derived through the reflection membrane 20 and the non-reflection membrane 5 of the window mirror 4, respectively. Since phase variation of laser beam depends upon the kind of coating membrane through which it passes, laser beam 7 in the resonator will be derived as a laser beam having spatial phase distribution without the phase compensating mirror 400. The phase compensating mirror 400 is intended to remove such phase difference. In the embodiment shown in FIG. 15, a portion of the phase compensating mirror 400 which corresponds to a boarder line between areas through which the laser beam portions 70 and 71 pass is stepped to form the stepped portion 200 to provide a difference in thickness of the phase compensating mirror between the areas. For example, it is assumed that phase of laser beam portion passing through the partial reflection membrane on the inner surface of the window mirror 4 leads that of the laser beam portion passing through the non-reflection membrane 5 by δ (degree). A depth d of the stepped portion 200 measured from the surface necessary to compensate this phase difference can be obtained by $$(n-1)d/\lambda = \delta \tag{2}$$

where n is defraction index of material of the phase compensating mirror 400 and λ is wavelength of laser beam.

Figure 16:
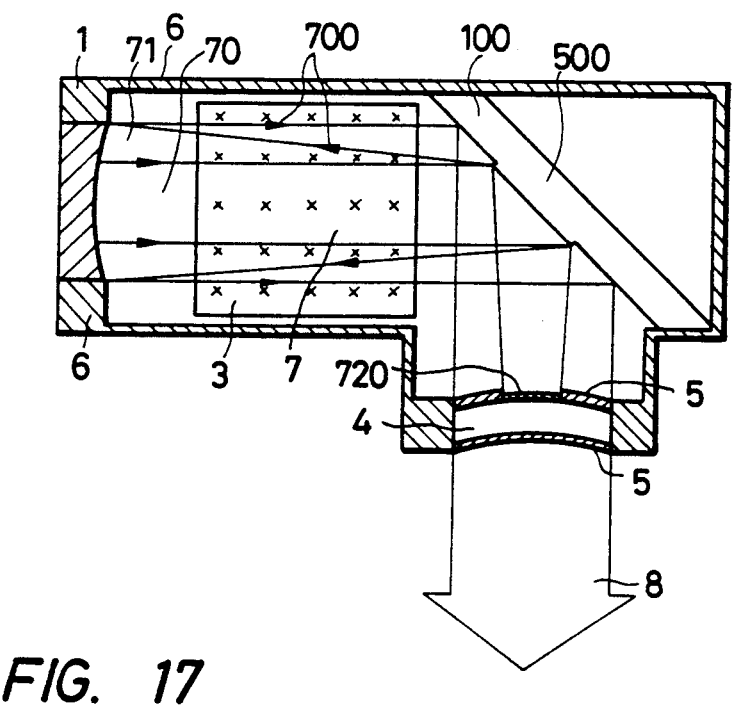

Although a transmissive mirror is used as a phase compensating mirror in the above embodiment, it is possible to use a reflective mirror for that purpose. FIG. 16 shows an embodiment in which a reflective mirror 500 is used as the phase compensating mirror. In this case, it is possible to generate a linearly polarized laser beam which is useful for high precision machining in which a linearly polarized beam is converted into a circularly polarized beam externally of the laser apparatus.

Figure 17:
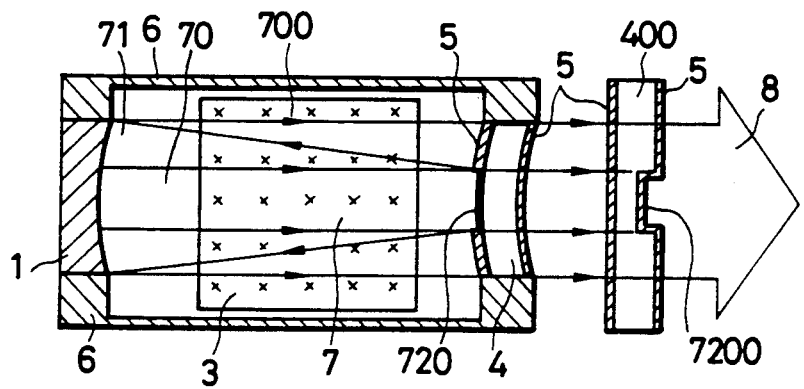
Figure 18:
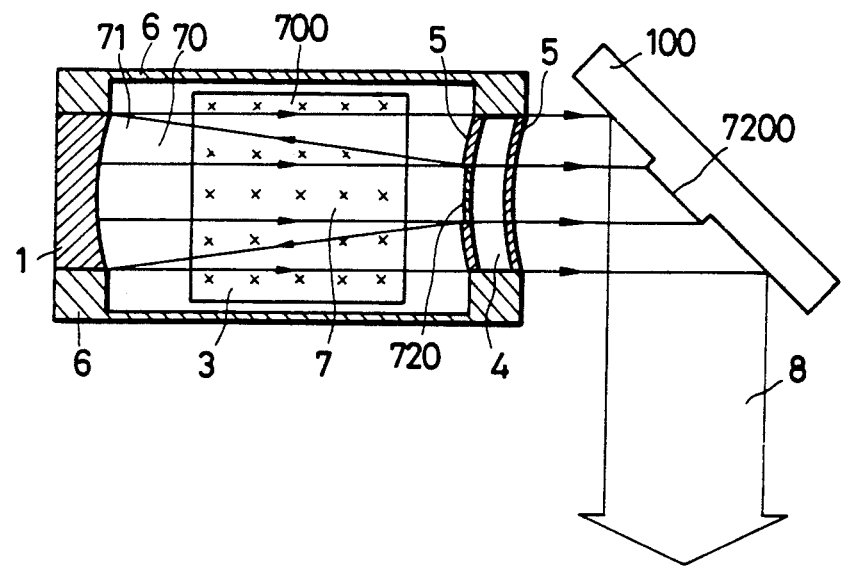

A position of the phase compensating mirror is not limited in the resonator. FIGS. 17 and 18 show other arrangements of the phase compensating mirror in which the latter is positioned externally of the resonator.

Figure 19:
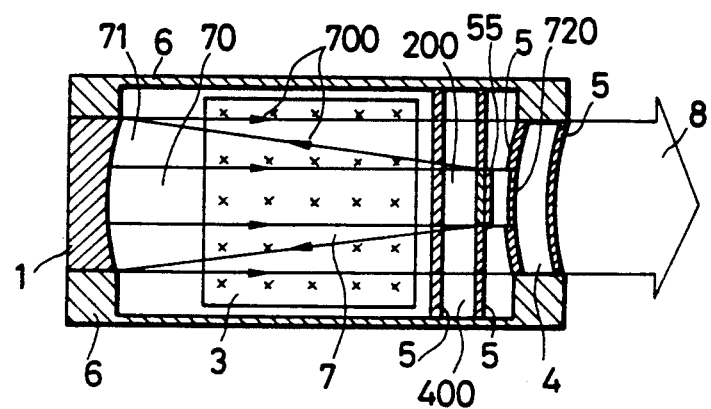

In the described embodiments, phase is varied by the stepped portion on the phase compensating mirror. Alternatively, such phase variation can be provided by using the non-reflection membranes 5 and 55 having different characteristics as shown in FIG. 19. Taking a mirror for $CO_2$ laser as an example, it is possible to provide a non-reflection coating membrane by using either a single $PbF_2$ layer or a doubled layer structure of a ZnSe layer and a $ThF_4$ layer on a ZnSe substrate, in which case, a resultant phase difference will be 20° or more. In any way, there may be many other schemes usable to realize the phase difference suitable to compensate for the phase difference between beams passing through the center portion and the annular outer portion of the expanding mirror.

Figure 20:
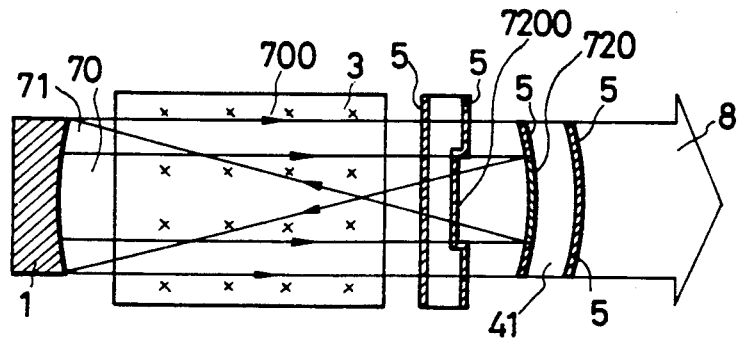

In this embodiment, the expanding mirror may be formed by using a concave mirror as shown in FIG. 20. Further, it is possible to compensate for such phase difference by modifying an outer configuration of the window mirror 4. The latter case will be described with reference to FIG. 21.

Figure 21:
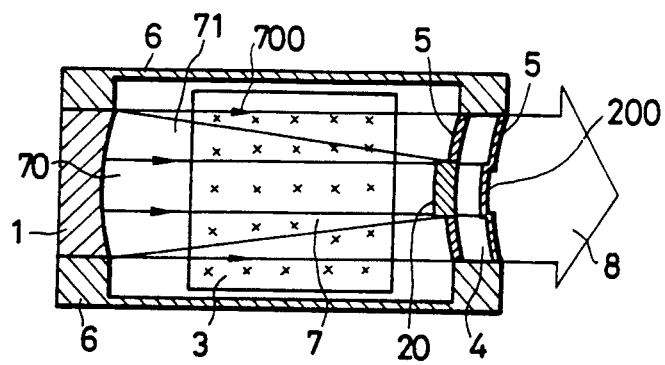

In FIG. 21, a convex window mirror 4 is formed on a center portion thereof facing to a collimating mirror 1 with a partial reflection membrane 20 having a partial reflectivity to thereby provide an expanding mirror. On an outer surface of the window mirror 4 facing to the partial reflection membrane 20, a stepped portion 200 is formed and, on an annular surface area surrounding the center portion and the other surface of the window mirror, non-reflection membranes 5 are formed.

The stepped portion 200 is formed by reducing thickness of the center portion of an outer surface of the convex mirror 4. The reduction of thickness is performed according to the equation (2).

Figure 22:
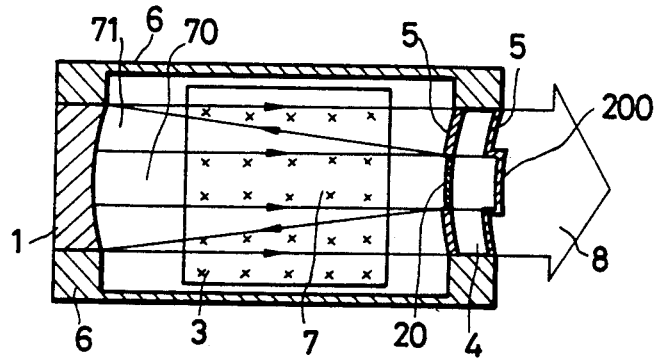

Alternatively, it is possible to form the stepped portion by increasing thickness of the portion of the convex mirror in question and FIG. 22 shows an example of the latter case.

Figure 23:
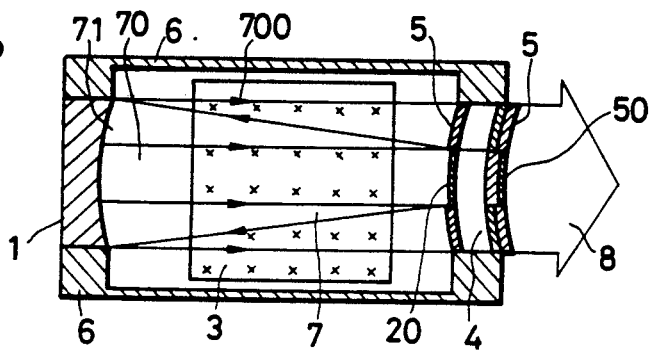
Figure 24:
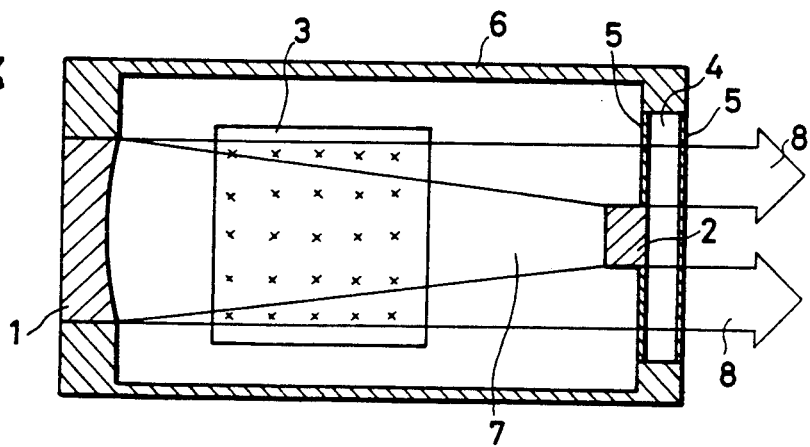
FIG. 24 is a cross-sectional side view of the conventional laser apparatus.

FIG. 23 shows an embodiment in which the stepped portion is formed by using different non-reflection membranes 5 and 50 on the outer surface of the convex mirror, as in the embodiment shown in FIG. 19.

According to the present invention in which the expanding mirror of the resonator has a partial transmittivity, it is possible to obtain an output laser beam having not annular bu circular cross sectional pattern which exhibits satisfactory condensation performance, without sacrifice of oscillation efficiency of a laser apparatus. Therefore, it becomes possible to realize a high speed, high precision laser machining with high efficiency. Since laser beam heat the window mirror uniformly, thermal stress of the mirror hardly occurs, causing an output laser beam to be derived stably for a prolonged time.

What is claimed is:

1. A laser apparatus comprising:
    means for producing a laser beam; and
    an unstable resonator including a beam expanding mirror formed on a convex or concave window mirror,
    said beam expanding mirror having a partial transmissivity of at least 5%,
    a collimating mirror disposed in facing relation to said expanding mirror, said expanding mirror enlarging said laser beam and reflecting said enlarged beam to said collimating mirror thereafter,
    said collimating mirror reflecting said beam back to said expanding mirror and an annular area of said window mirror surrounding said expanding mirror; and
    means for allowing portions of said laser beam to transmit through said expanding mirror and said annular area,
    said allowing means also cancelling out phase differences between said portions of said laser beam.

2. The laser apparatus as claimed in claim 1, wherein said expanding mirror is formed on a center portion of said convex or concave window mirror.

3. The laser apparatus as claimed in claim 2, wherein said expanding mirror if formed by forming on said center portion of said convex or concave mirror a reflection membrane having a partial reflectivity.

4. The laser apparatus of claim 1, wherein the transmissivity of said expanding mirror is at least 5%.

5. A laser apparatus, comprising:
    means for producing a laser beam; and
    an unstable resonator including a beam expanding mirror formed on a convex or concave window mirror, said beam expanding mirror having a partial transmissivity,
    a collimating mirror disposed in facing relation to said expanding mirror, said expanding mirror enlarging said laser beam and reflecting said enlarged beam to said collimating mirror thereafter,
    said collimating mirror reflecting said beam back to said expanding mirror and an annular area of said window mirror surrounding said expanding mirror,
    said expanding mirror being formed by a partially reflective mirror located on an inner center portion of said window mirror, said annular area of said window mirror having both surfaces coated with non-reflection membrane, wherein the transmissivity of said partially reflective mirror is at least 5%.

6. The laser apparatus as claimed in claim 5, wherein said expanding mirror is formed on a center of said convex or concave window mirror.

7. The laser apparatus as claimed in claim 6, further comprising means for allowing portions of said laser beam through said expanding mirror and said annular area,
    said allowing means also for cancelling out a phase difference between said portions of said laser beam.

8. The laser apparatus as claimed in any of claims 3 or 5-7, wherein said partial reflection membrane is composed of a single layer.

9. The laser apparatus as claimed in claim 8, wherein said partial reflection membrane is of the same material as that of a substrate of said expanding mirror.

10. The laser apparatus as claimed in any one of claims 3 or 5-7 wherein said membrane is composed of an ionized cluster beam membrane.

11. The laser apparatus as claimed in any one of claims 3 or 5-7 wherein said membrane is composed of an ionized cluster beam membrane.

12. A laser apparatus comprising:
    means for producing a laser beam; and
    an unstable resonator including a beam expanding mirror formed on a convex or concave window mirror, said beam expanding mirror having a partial transmissivity of at least 5%,
    a collimating mirror disposed in facing relation to said expanding mirror, said expanding mirror enlarging said laser beam and reflecting said enlarged beam to said collimating mirror thereafter,
    said collimating mirror reflecting said beam back to said expanding mirror and to an annular area of said window mirror surrounding said expanding mirror,
    said expanding mirror being formed by removing a non-reflection membrane from an inner center portion of said window mirror, wherein said window mirror has both surfaces coated with said non-reflection membrane.

13. The laser apparatus as claimed in claim 12, wherein said expanding mirror is formed on a center portion of said convex or concave window mirror.

14. The laser apparatus as claimed in claim 13, further comprising means for allowing portions of said laser beam through said expanding mirror and said annular area,
    said allowing means also for cancelling out a phase difference between said portions of said laser beam.

15. The laser apparatus as claimed in any of claims 1-3, 5-7 or 12-14, wherein radii of curvature of opposite surfaces of said expanding mirror are equal.

16. The laser apparatus as claimed in claim 15, wherein a reflection membrane having the same diameter as said expanding mirror and facing said expanding mirror is provided on a center portion of said collimating mirror.

17. The laser apparatus as claimed in claim 16, wherein the thickness d of said reflection membrane is determined by $$d = \left| \lambda \cdot \frac{\Theta}{360} \right|$$

where $\lambda$ is wavelength of laser beam and $\Theta$ is phase difference between said portions of said laser beam passing through said expanding mirror and said annular area of said window mirror.

18. The laser apparatus as claimed in claim 15, wherein said collimating mirror is coated with a reflection membrane except a center portion thereof, said reflection membrane having the same diameter as said expanding mirror and faced thereto.

19. The laser apparatus as claimed in claim 15, wherein a center portion of said collimating mirror facing to said expanding mirror is stepped, said stepped portion having the said diameter as said expanding mirror.

20. The laser apparatus as claimed in claim 15, wherein said expanding mirror is stepped with respect to said annular area.

21. The laser apparatus as claimed in claim 15, wherein said allowing means comprises a difference in outer surface construction between said expanding mirror and said annular area.

22. The laser apparatus as claimed in claim 21, wherein said difference comprises a step formed between said expanding mirror and said annular area.

23. The laser apparatus as claimed in claim 21, wherein said difference comprises a difference in construction between membranes formed on said expanding mirror and said annular area.

24. The laser apparatus as claimed in any of claims 1-3, 5-7 or 12-14, wherein said partial transmissivity of said expanding mirror is constant throughout the surface thereof.

25. The laser apparatus as claimed in any one of claims 1 to 3, 12 or 14, wherein said deriving means comprises a phase compensation mirror.

26. The laser apparatus as claimed in claim 25, wherein said phase compensation mirror has a first portion through which said laser beam portion corresponding to said annular area passes and a second portion through which said laser beam portion corresponding to said expanding mirror passes, said first and second portions of said phase compensation mirror having different construction from each other.

27. The laser apparatus as claimed in claim 26, wherein a difference in construction between said first and second portion of said phase compensation mirror is given by a step formed between said first and second portions thereof.

28. The laser apparatus as claimed in claim 27, wherein said phase compensation mirror comprises a reflection mirror and said step is given by forming a metal membrane on said reflection mirror.

29. The laser apparatus as claimed in claim 26, wherein a difference in construction between said first and second portions of said phase compensation mirror is given by a difference in construction between membranes formed on said first and second portions of said phase compensation mirror.

* * * * *

UNITED STATES PATENT AND TRADEMARK OFFICE
CERTIFICATE OF CORRECTION

PATENT NO. : 5,058,123

DATED : October 15, 1991

INVENTOR(S) : Koji Yasui et al.

It is certified that error appears in the above-identified patent and that said Letters Patent is hereby corrected as shown below:

Title page:

In Foreign Application Priority Data, delete Japanese Patent Application Number "61-29186" and insert Japanese Patent Application Number --61-291786.--

Signed and Sealed this

Twenty-third Day of March, 1993

Attest:

STEPHEN G. KUNIN

*Attesting Officer*     Acting Commissioner of Patents and Trademarks